(12) United States Patent
Oliver et al.

(10) Patent No.: US 7,221,356 B2
(45) Date of Patent: May 22, 2007

(54) DATA INPUT DEVICE AND METHOD FOR DETECTING AN OFF-SURFACE CONDITION BY A LASER SPECKLE SIZE CHARACTERISTIC

(75) Inventors: Thomas C. Oliver, Windsor, CO (US); Jeremiah M. Pope, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 575 days.

(21) Appl. No.: 10/787,642

(22) Filed: Feb. 26, 2004

(65) Prior Publication Data

US 2005/0190157 A1    Sep. 1, 2005

(51) Int. Cl.
*G09G 5/00* (2006.01)

(52) U.S. Cl. .................. 345/166; 345/156

(58) Field of Classification Search ........... 345/156, 345/163, 166; 250/221, 50; 348/734; 356/496; 178/18.01, 19.01, 18.09, 19.05
See application file for complete search history.

(56) References Cited

U.S. PATENT DOCUMENTS

| | | |
|---|---|---|
| 4,364,035 A | 12/1982 | Kirsch |
| 4,719,455 A | 1/1988 | Louis |
| 4,794,384 A | 12/1988 | Jackson |
| 5,274,361 A | 12/1993 | Snow |
| 5,574,480 A | 11/1996 | Pranger et al. |
| 5,644,139 A | 7/1997 | Allen et al. |
| 5,712,658 A | 1/1998 | Arita et al. |
| 5,729,009 A | 3/1998 | Dändliker et al. |
| 5,793,357 A | 8/1998 | Ivey et al. |
| 5,907,152 A | 5/1999 | Dändliker et al. |
| 5,914,783 A | 6/1999 | Barrus |
| 6,031,218 A | 2/2000 | Piot et al. |
| 6,057,540 A | 5/2000 | Gordon et al. |
| 6,124,587 A | 9/2000 | Bidiville et al. |

(Continued)

FOREIGN PATENT DOCUMENTS

| | | |
|---|---|---|
| EP | 0295720 A2 | 12/1988 |
| GB | 2272763 A | 5/1994 |

OTHER PUBLICATIONS

Asakura et al., "Dynamic Laser Speckles and Their Application to Velocity Measurements of the Diffuse Object," Applied Physics, 1981, 179-194.

(Continued)

*Primary Examiner*—Richard Hjerpe
*Assistant Examiner*—Abbas I. Abdulselam
(74) *Attorney, Agent, or Firm*—Senniger Powers

(57) ABSTRACT

A data input device for use with a tracking surface having light-scattering properties with respect to the device is disclosed. The device comprises a coherent light source for projecting a coherent light beam onto the tracking surface. The tracking surface scatters the coherent light beam striking the tracking surface. The device further comprises a detector associated with the coherent light source for detecting at least a portion of the scattered light. The detected portion of the scattered light comprising a speckle pattern. The device further comprises a controller configured to respond to the detected speckle pattern and operate the device in one of a tracking mode and a non-tracking mode, depending upon a speckle size characteristic of the detected speckle pattern as determined by the controller.

39 Claims, 14 Drawing Sheets

U.S. PATENT DOCUMENTS

| | | |
|---|---|---|
| 6,246,482 B1 | 6/2001 | Kinrot et al. |
| 6,249,591 B1 | 6/2001 | Tullis |
| 6,256,016 B1 | 7/2001 | Piot et al. |
| 6,281,882 B1 | 8/2001 | Gordon et al. |
| 6,323,839 B1 | 11/2001 | Fukuda et al. |
| 6,330,057 B1 | 12/2001 | Lederer et al. |
| 6,331,848 B1 | 12/2001 | Stove et al. |
| 6,424,407 B1 | 7/2002 | Kinrot et al. |
| 6,448,977 B1 | 9/2002 | Braun et al. |
| 6,452,683 B1 | 9/2002 | Kinrot et al. |
| 6,455,840 B1 | 9/2002 | Oliver et al. |
| 6,498,604 B1 | 12/2002 | Jensen |
| 6,531,692 B1 | 3/2003 | Adan et al. |
| 6,618,037 B2 * | 9/2003 | Sakamaki et al. .......... 345/163 |
| 6,642,506 B1 | 11/2003 | Nahum et al. |
| 6,677,929 B2 | 1/2004 | Gordon et al. |
| 6,918,538 B2 | 7/2005 | Breytman |
| 7,002,549 B2 | 2/2006 | McCahon et al. |
| 7,009,700 B2 | 3/2006 | Dubois et al. |
| 7,098,894 B2 * | 8/2006 | Yang et al. ................. 345/166 |
| 2002/0145588 A1 | 10/2002 | McCahon et al. |
| 2003/0103037 A1 | 6/2003 | Rotzoll |
| 2004/0061680 A1 | 4/2004 | Taboada |
| 2005/0035947 A1 | 2/2005 | Lutian |

OTHER PUBLICATIONS

Meyer, "Pen Computing: A Technology Overview and A Vision," ACM SIGCHI Bulletin, Jul. 1995, pp. 46-90, vol. 27, Issue 3, ACM Press, New York, USA.

Ohtsubo et al., "Velocity Measurement of a Diffuse Object by Using Time-Varying Speckles," Optical and Quantum Electronics, 1976, pp. 523-529, Chapman and Hall Ltd., Great Britain.

Optical Mouse Saves Space, The Online Photonics Resource, http://optics.org, Dec. 8, 2003, 2 pp., United States.

Optical Scrolling, The Online Photonics Resource, http://optics.org, Dec. 8, 2003, 1 pg., United States.

Prototype Device, The Online Photonics Resource, http://optics.org, Dec. 8, 2003, 1 pg., United States.

Schnell, et al., "Detection of Movement with Laser Speckle Patterns: Statistical Properties," Optical Society of America, Jan. 1998, pp. 207-216, vol. 15, No. 1.

* cited by examiner

DATA INPUT DEVICE AND METHOD FOR DETECTING AN OFF-SURFACE CONDITION BY A LASER SPECKLE SIZE CHARACTERISTIC

TECHNICAL FIELD

Embodiments of the present invention relate to the field of computer input devices, and particularly data input devices, such as a mouse or an optical pen, employing light striking a tracking surface for detecting movement. In particular, embodiments of this invention relate to data input devices capable of projecting a coherent light beam onto the tracking surface to scatter the coherent light beam, detecting at least a portion of the scattered light, the detected portion comprising a speckle pattern, and operating the device in one of a tracking mode and a non-tracking mode depending upon a speckle size characteristic of the detected speckle pattern.

BACKGROUND OF THE INVENTION

Previous computer input devices, such as mice, include rotatable balls mounted within a housing, yet rotatably engaging a surface. As the housing of such a mechanical mouse translates across the surface, the ball rotates within the housing, engaging horizontally and vertically situated wheels that rotate against the ball, thereby indicating horizontal (e.g., side to side or x-direction) and vertical (e.g., back and forth or y-direction) movement of the mouse across the surface. When the device is lifted from the surface, hereinafter referred to as "lift-off" or the detection of an "off-surface" condition, the ball stops rotating and the horizontal and vertical movement information provided by the wheels stops. This feature is particularly useful to a user who has reached a point where the device can no longer move with respect to the tracking surface, but the user would like to continue tracking in that particular direction on a display. By lifting the device off of the tracking surface, the user can reposition the device, while a display cursor remains stationary because tracking is suspended during lift-off. When tracking resumes, horizontal and vertical wheel rotation translates into a displayed visual image of the display cursor responding to movement of the device. Because such devices have a moving ball passing through a hole in the housing, such devices may become contaminated with dust and dirt, yielding inaccurate or intermittent cursor tracking. Moreover, the tracking surface and ball require sufficient friction between the two to cause the ball to rotate when the housing translates over the surface. To help provide such friction and minimize device contamination, specialized tracking surfaces (e.g., mouse pads) are typically used. Thus, a major limitation of such a device is that it requires a tracking surface with particular characteristics, such as adequate friction and cleanliness, which are not readily found on all surfaces that would otherwise be useful for tracking.

Building upon these primarily mechanical tracking devices, optical tracking devices have become available. Such devices optically track movement relative to a surface, rather than mechanically as with the devices described immediately above. These optical tracking devices may avoid some of the drawbacks associated with the mechanical devices described above. In particular, optical devices typically do not require contact between wheels and a movable ball, which acts as a common collection point for dust and dirt. Instead, the movable ball may be covered with a distinct pattern. As the ball rotates over a surface due to movement of the input device, photodetectors facing another side of the ball collect information about the movement of the ball's distinct pattern as the ball rotates. A tracking engine collects this information, determines the direction the pattern is translating, and translates the cursor on the display, as similarly described above. Lift-off detection is performed as discussed above, such that when the device is lifted, the ball stops moving and the device stops tracking. These devices offer benefits over previous designs by eliminating moving parts (the wheels) and changing the ball detection interaction from mechanical to optical. However, such devices lack the ability to track on any surface, requiring a suitable frictional interface between the ball and the surface. Moreover, these devices still require one moving part, namely, the ball. Moreover, such devices may become contaminated with dust and dirt, thereby possibly obscuring the detected pattern and/or creating fixed pattern noise on the detected image. Finally, aliasing artifacts may also cause the cursor to skip, rather than move fluidly.

Still other optical devices place a pattern on the tracking surface (e.g., a mouse pad), rather than on the rotatable ball, thereby using the mouse pad to generate optical tracking information. Although such devices are able to eliminate the moving ball, they are less universal by requiring a specific tracking surface to operate.

Other more recent optical tracking devices eliminate the need for a patterned ball or mouse pad. One such device utilizes an LED to project light across the tracking surface at a grazing angle relative to the tracking surface. The mouse then collects tracking information by detecting the differences between the illuminated high points in the surface texture and dark shadows cast by the high points, which appear as dark areas. Such an LED device eliminates the moving ball of previous devices, and is useful on a variety of surfaces. However, smooth surfaces with little color variation, such as surfaces with a fine microfinish similar to glass or clear plastic, may prove difficult to track upon. Like the devices discussed in the paragraph above, these devices need not specifically address detection of an off-surface condition when the device has been removed from the tracking surface. Instead, they utilize focused optics and are thus inherently unable to track if the device has been lifted a significant distance from the tracking surface.

SUMMARY OF THE INVENTION

Accordingly, a data input device capable of projecting a coherent light beam onto a tracking surface to scatter the light beam, detecting a portion of the scattered light (the portion comprising a speckle pattern), and operating the device in one of a tracking mode and a non-tracking mode depending upon a speckle size characteristic of the detected speckle pattern is desired to address one or more of these and other disadvantages.

In accordance with one aspect of the invention, a data input device for use with a tracking surface having light-scattering properties with respect to the device is disclosed. The device comprises a coherent light source for projecting a coherent light beam onto the tracking surface. The tracking surface scatters the coherent light beam striking the tracking surface. The device comprises a detector associated with the coherent light source for detecting at least a portion of the scattered light. The detected portion comprises a speckle pattern. The device comprises a controller configured to respond to the detected speckle pattern and operate the device in one of a tracking mode and a non-tracking mode depending upon a speckle size characteristic of the detected speckle pattern as determined by the controller.

In another aspect of the invention, a method comprises projecting a coherent light beam from a data input device onto a tracking surface having light-scattering properties. The tracking surface scatters the coherent light beam. The method further comprises detecting at least a portion of the light scattered by the tracking surface; the detected portion comprising a speckle pattern. The method further comprises determining if the device is spatially separated from the tracking surface by at least a lift-off detection distance as a function of a speckle size characteristic of the speckle pattern. The method further comprises either suspending tracking of relative movement between the device and the tracking surface when the device is spatially separated from the tracking surface by at least the lift-off detection distance or maintaining tracking of relative movement between the device and the tracking surface when the device is spatially separated from the tracking surface by less than the lift-off detection distance.

In yet another aspect of the invention, a data input device for use with a tracking surface comprises a coherent light source and a detector, generally as set forth above. The device also comprises a controller configured to respond to the detected speckle pattern and determine a distance between the device and the tracking surface depending upon a speckle size characteristic of the detected speckle pattern as determined by the controller.

Alternatively, the invention may comprise various other methods and apparatuses.

Other features will be in part apparent and in part pointed out hereinafter.

DETAILED DESCRIPTION OF THE INVENTION

Figure 1:
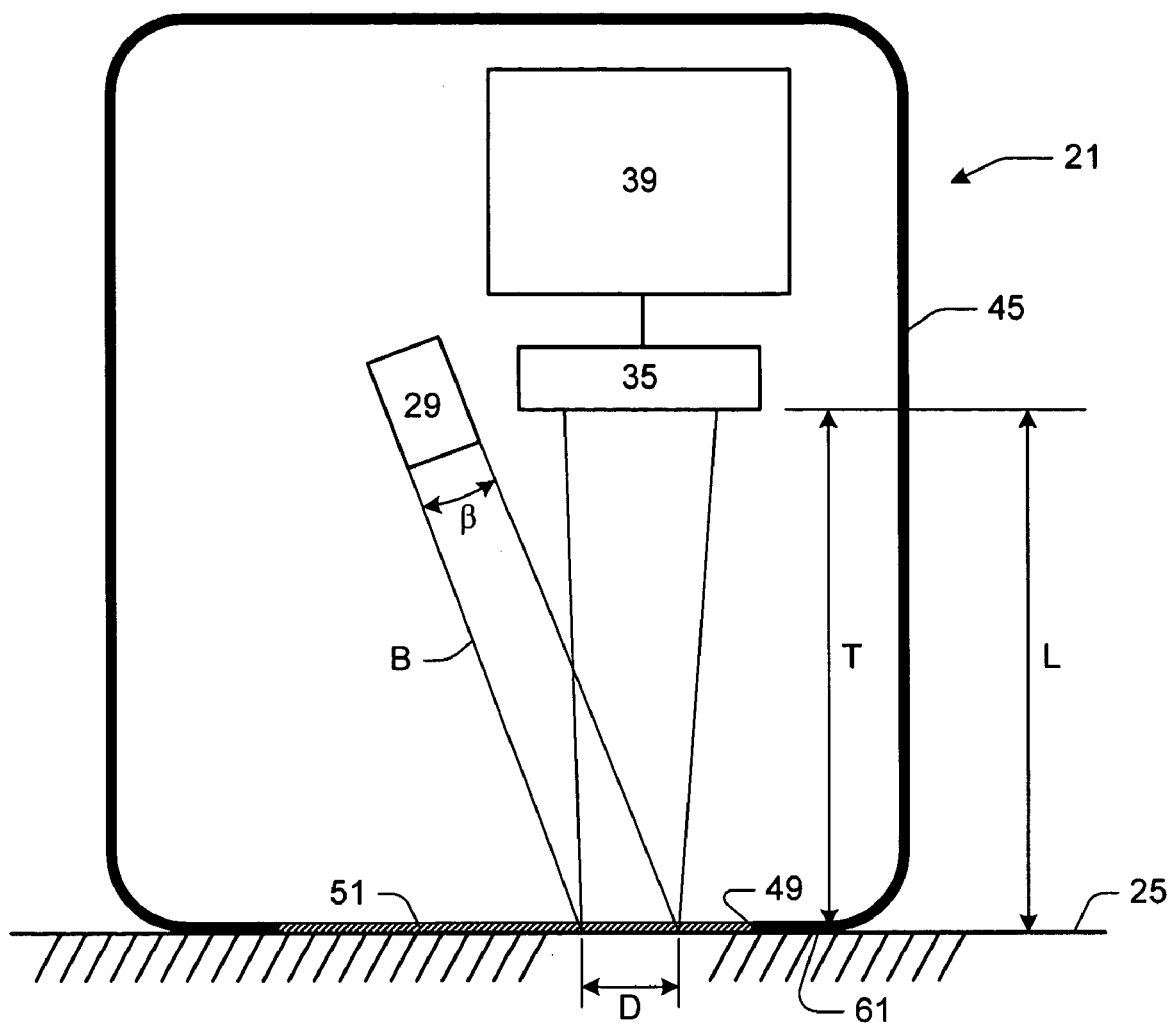
FIG. 1 is a schematic of a device of the present invention engaging a tracking surface.
Figure 2:
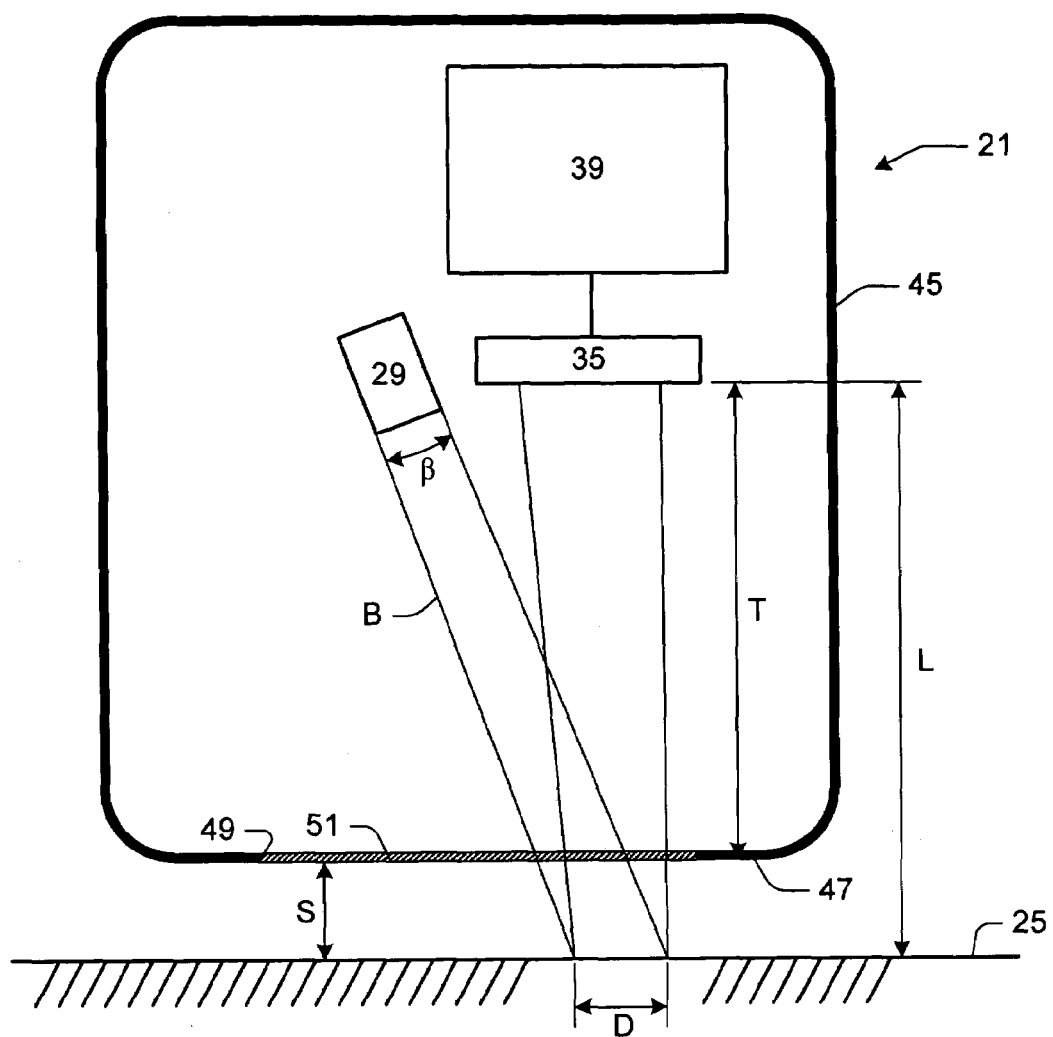
FIG. 2 is a schematic of the device of FIG. 1 lifted from the tracking surface.

Referring first to FIGS. 1 and 2, a data input device, generally indicated 21, for use with a tracking surface 25 is depicted. Although such a device 21 is typically capable of tracking relative movement between the device and the tracking surface 25 (described above as horizontal-vertical movement or x-y movement), it should be noted here that a focus of the present disclosure specifically involves detection of an off-surface condition. Any of the various tracking schemes known in the relevant art may be coupled with the teaching of the present invention for lift-off detection. It should be noted here that the terms "lift-off", "off-surface condition" or "lifting" the device 21 additionally comprise either lifting, or moving, the tracking surface 25 away from the stationary device (e.g., FIG. 4C), or lifting the device away from the tracking surface (e.g., FIGS. 2 and 4). In addition, referring to relative movement between the device 21 and the tracking surface 25 in a z-direction may comprise movement of the device (e.g., a mouse lifted from a mouse pad), movement of the tracking surface (e.g., a moving trackball or human skin moving in the path of a coherent light beam), or movement of both the tracking surface and the device.

Figure 5:
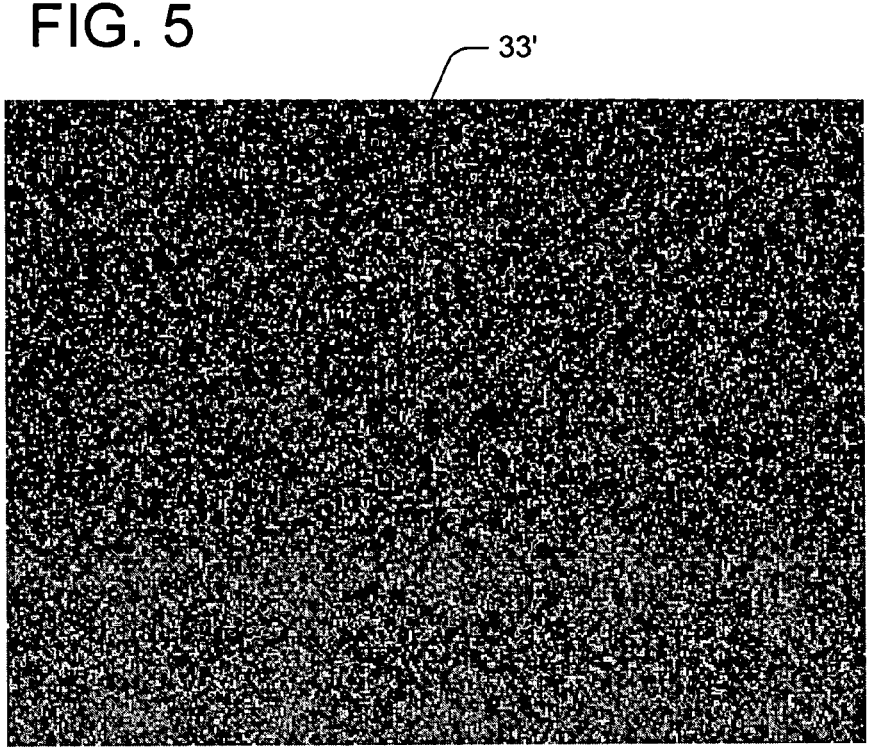
FIG. 5 is an image of a speckle pattern.
Figure 6:
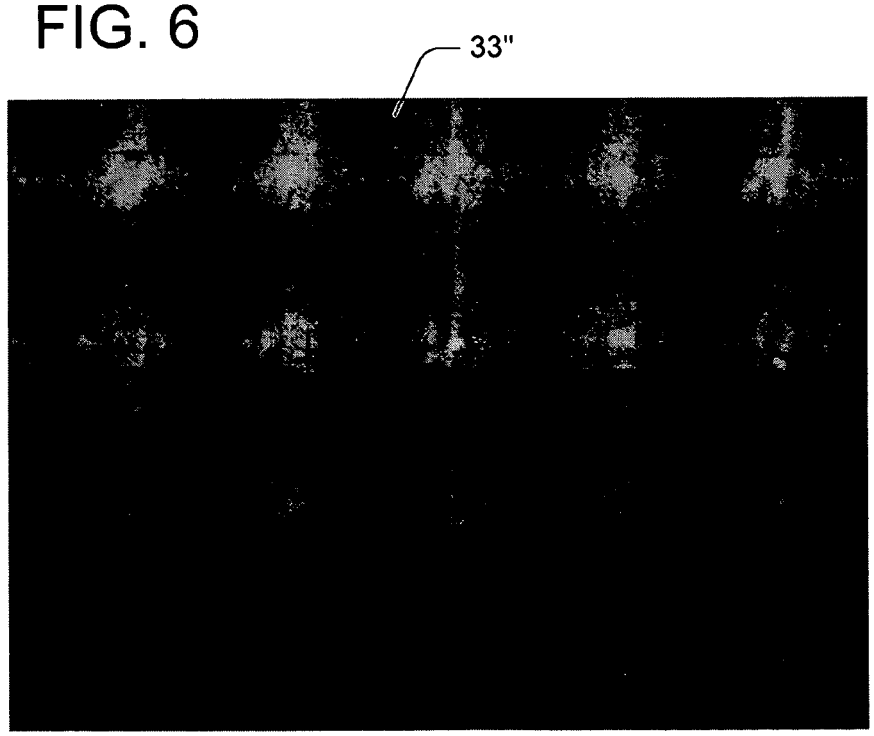
FIG. 6 is an image of a speckle pattern with a larger average speckle size than the speckle pattern of FIG. 5.

The device 21 generally comprises a coherent light source 29, such as a laser, for projecting a coherent light beam B onto the tracking surface 25. The tracking surface then scatters the coherent light beam striking the tracking surface, thereby diffusing the light in many directions. As used herein, scattering may also be considered reflecting the coherent light in many directions. The device 21 further comprises a detector 35, or detector array, associated with the coherent light source 29 for detecting at least a portion of the light scattered from the tracking surface 25. Due to the inherent properties of coherent light, the detected portion of the scattered light comprises a speckle pattern 33 (FIGS. 5 and 6). As described in greater detail below, the detected speckle pattern 33 may provide an indication of lift-off of the device 21. In one example, the detector 35 may mount on an integrated circuit. Moreover, both tracking and lift-off detection may occur simultaneously based upon the same data detected by the detector 35. Suitable detectors may include photodetectors, CCDs (charge-coupled devices), CMOS (complementary metal-oxide semiconductor) technology, or other detector arrays, such as those integral with the coherent light source.

The device 21 further comprises a controller 39 responsive to the detected speckle pattern 33 to operate the device 21 in one of a tracking mode and a non-tracking mode depending upon a speckle size characteristic of the detected speckle pattern as determined by the controller 39. The controller processes the output (the detected speckle pattern 33) of the detector 35 to operate the device 21. Moreover, the controller 39 is responsive to the speckle pattern 33 to determine a separation distance S between the device 21 and the tracking surface 25 (see FIGS. 2, 4, 4A and 4B), depending upon the speckle size characteristic of the detected speckle pattern 33 as determined by the controller 39. In some embodiments, described in more detail below, the speckle size characteristic is related to the separation distance S between the housing 21 and the tracking surface 25. Those skilled in the art would recognize that the controller 39 may be either a processor or an application-specific integrated circuit (ASIC), among other things. The controller 39 may further comprise imaging processing firmware or circuitry to process the detected speckle pattern 33, as would be understood by one skilled in the art.

The device 21 further comprises a housing 45 associated with the coherent light source 29 and the detector 35 for containing and protecting the components of the device. The housing 45 includes a support surface 47 adapted to engage the tracking surface 25 during a tracking mode of the device 21. The housing 45 may take any form, without departing from the scope of the claimed invention. For example, the housing 45 may be in the shape of a mouse, a trackball, an optical pen, or any other data input device 21. The housing 45 further comprises an aperture 49 covered by a transparent window 51 that allows the coherent light beam B to pass through the housing and fall upon the tracking surface 25, while limiting the ability of dust and dirt to enter the housing. The transparent window 51 must be of a sufficient smoothness and transparency to allow the coherent light beam B to pass freely through the window without scattering the light back toward the detector, so that the detector improperly detects a speckle pattern associated with the window, rather than the tracking surface. Alternately, the window may not be included at all.

Figure 3:
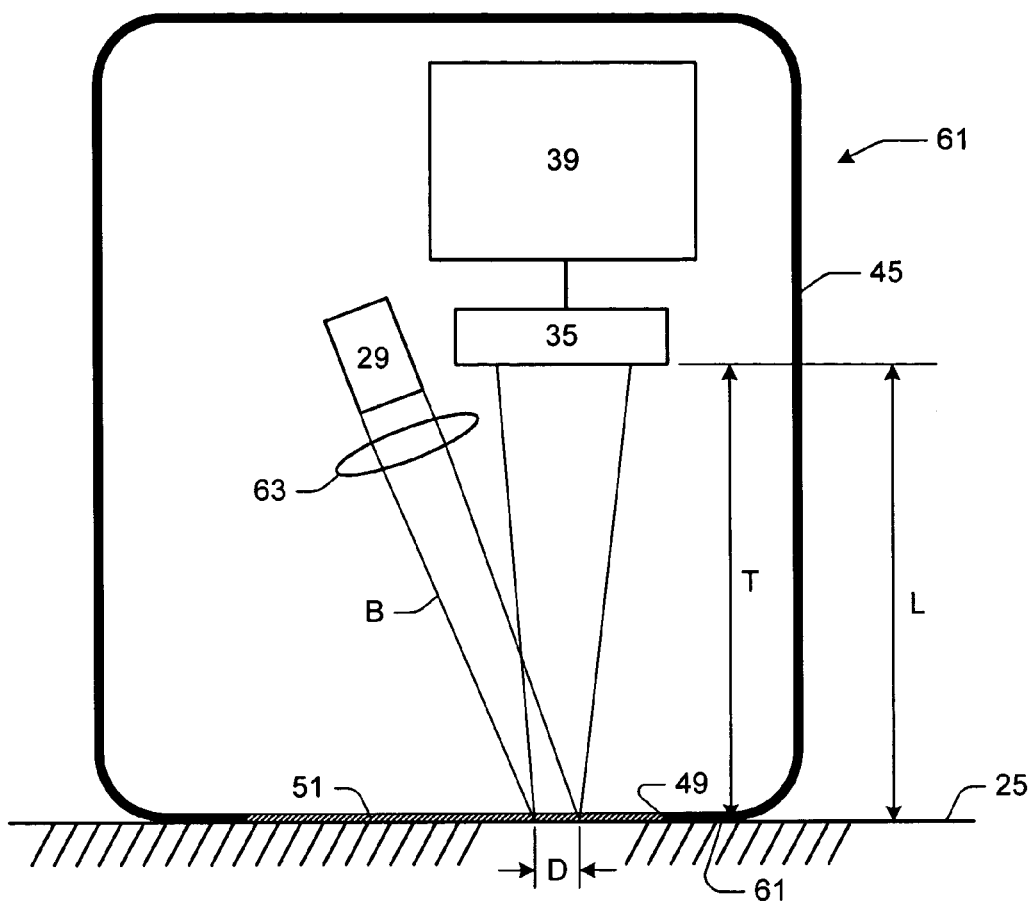
FIG. 3 is a schematic of another device of the present invention engaging the tracking surface.
Figure 4:
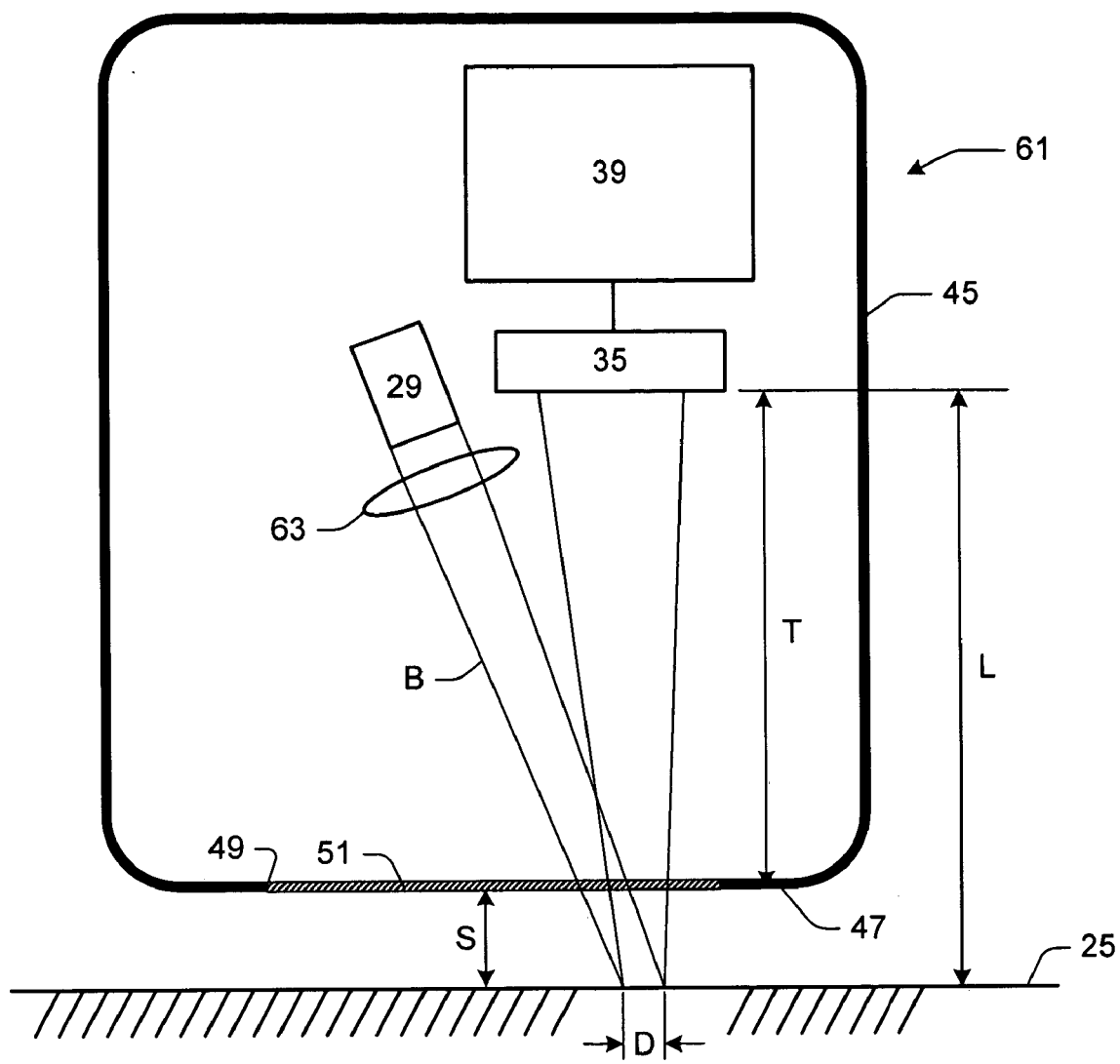
FIG. 4 is a schematic of the device of FIG. 3 lifted from the tracking surface.

Referring now to FIGS. 3 and 4, a schematic of another device of the claimed invention, generally indicated 61, comprises a housing 45, a coherent light source 29, a detector 35, and a controller 39, generally as set forth above. In addition, the device 61 comprises an optic 63 arranged between the coherent light source 29 and the tracking surface 25 for refracting the coherent light beam B. Such an optic 63 may be a converging or a diverging optic, as discussed below with respect to determining an average speckle grain size. Although not shown, the optic 63 may also be integral with the coherent light source 29. In other respects, the device 61 of FIGS. 3 and 4 functions similarly to the device 21 of FIGS. 1 and 2.

Figure 4A:
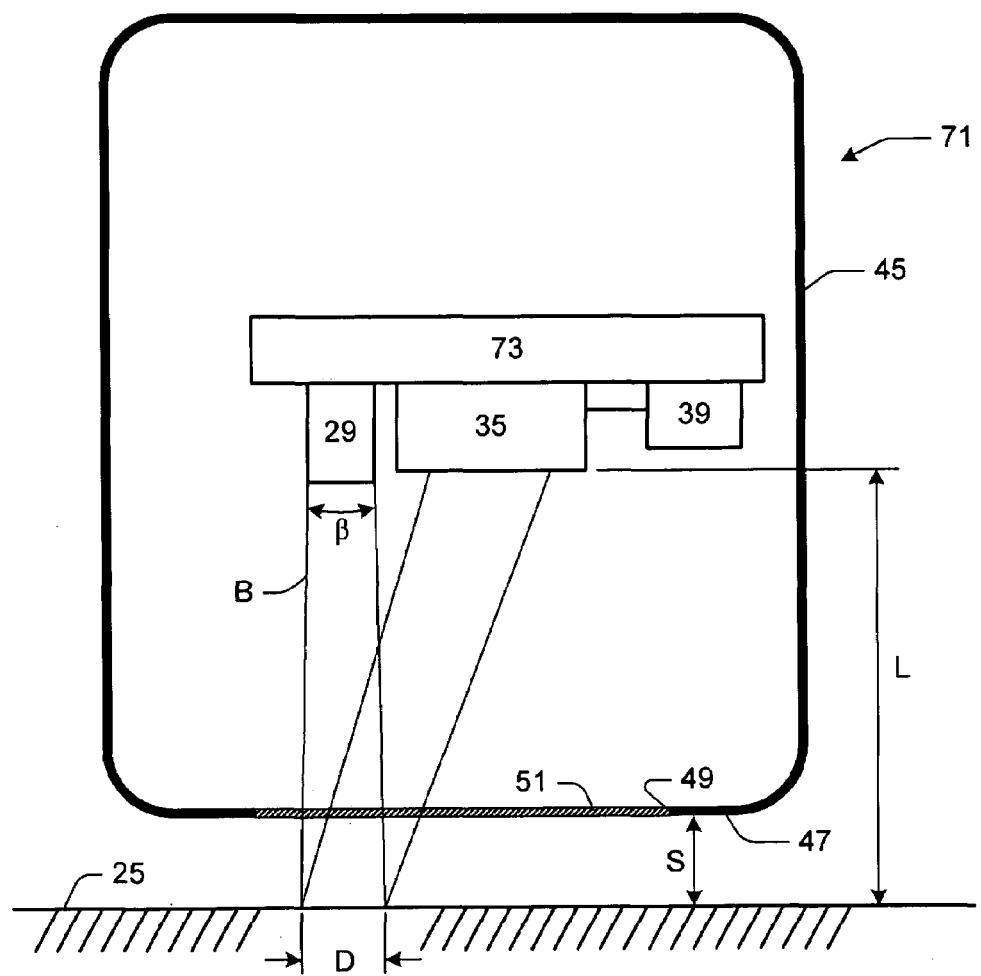
FIG. 4A is a schematic of yet another device of the present invention engaging the tracking surface.
Figure 4B:
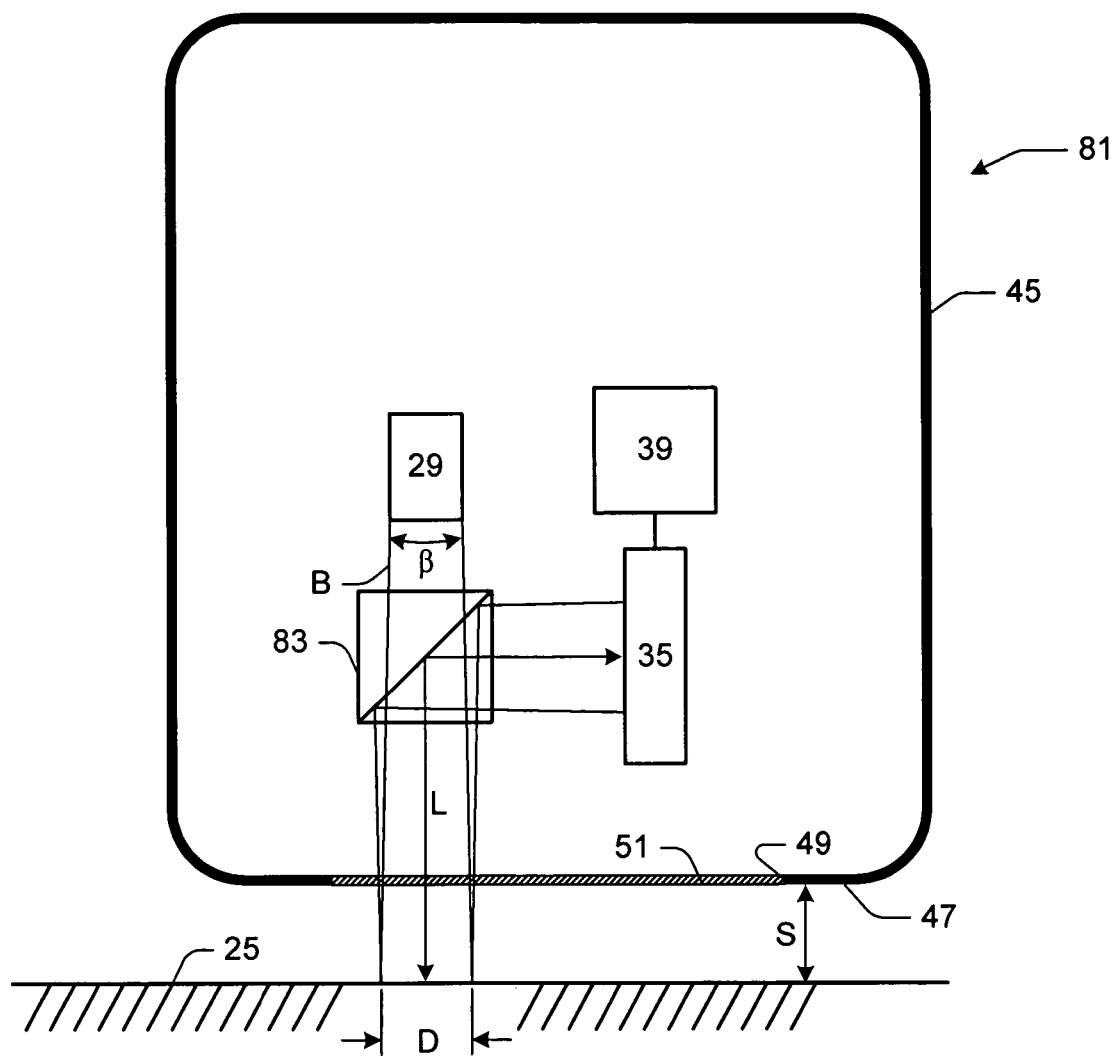
FIG. 4B is a schematic of a further device of the present invention lifted from the tracking surface.

Turning to FIG. 4A, a schematic of yet another device of the claimed invention, generally indicated 71, comprises several components mounted on a common substrate 73. Specifically, the device 71 comprises a housing 45, a coherent light source 29, a detector 35, and a controller 39, generally as set forth above. In addition, the controller 39, the detector 35, and the coherent light source 29 are mounted adjacent each other on the same substrate 73, providing the added benefit during manufacturing of allowing these components to be added to the device 71 as a single assembly. Moreover, the single substrate 73 aids in packaging the device 71 because it is compact and lowers cost, as only a single substrate is necessary. More importantly, mounting the detector 35 and the coherent light source 29 on the same substrate allows these two components to be mounted closer to one another for compactness. The substrate 73 may comprise at least one of a micro-chip, a printed circuit board (PCB), and a leadframe. In other respects, the device 67 of FIG. 4A functions similarly to the device 21 of FIGS. 1 and 2.

In general, numerous types of tracking surfaces 25 will scatter the coherent light beam B to provide a sufficient amount of scattered light back toward the detector 35 for detection as a speckle pattern 33. In particular, tracking surfaces 25 that are optically rough have adequate light-scattering properties with respect to the device 21. An optically rough surface scatters coherent, or laser, light in many directions, making the orientation of the coherent light beam B with respect to the tracking surface 25 relatively unimportant (with respect to detecting the scattered light comprising the speckle pattern 33). For example, for optically rough tracking surfaces 25, the coherent light beam B may be oriented at several acceptable angles relative to the tracking surface because the optically rough tracking surface scatters the light in many directions, including toward the detector 35. For instance, optically rough surfaces include many common tracking surfaces 25, including paper, wood, metal, fabric, certain plastics, and human skin (e.g., FIG. 4C).

Only surfaces that are perfectly reflective, i.e., mirror-like, such as a ground and polished, optic-quality, flat, transparent glass, are insufficiently rough enough to scatter the coherent light beam B in many directions. These surfaces will act as a mirror and primarily reflect laser light exactly opposite the angle of incidence of the laser 29, rather than scattering the light in many directions. For the present device 21 to detect lift-off from such a tracking surface 25, the laser 29 and detector 35 may be oriented as shown in the schematic in FIG. 4B. The device depicted in FIG. 4B, generally indicated 81, comprises a housing 45, a coherent light source 29, a detector 35, and a controller 39, generally as set forth above. In addition, the device 81 includes a beam splitter 83 for reflecting the coherent light beam B. Such a beam splitter 83 allows at least some light striking a first side of the beam splitter to pass through the beam splitter in one direction, while reflecting at least some light striking a second side of the beam splitter. More importantly, the beam splitter 83 does not significantly scatter, or diffuse, the light and therefore does not generate speckle. Even if the detector 35 detects the light beam B passing through the beam splitter 83, the detected light does not contain the essential properties necessary for determining an off-surface condition. For the present device 81, the beam splitter 83 is oriented at an oblique angle relative to the coherent light beam B reflected from the tracking surface 25 (e.g., 785 milliradians (45 degrees)), and the detector 35 mounts in the path of the coherent light reflected by the beam splitter. In this configuration, the coherent light beam B may be oriented perpendicular to the tracking surface 25 during the tracking mode, thereby allowing lift-off detection from a highly reflective tracking surface that does not scatter a speckle pattern in many directions.

Figure 4C:
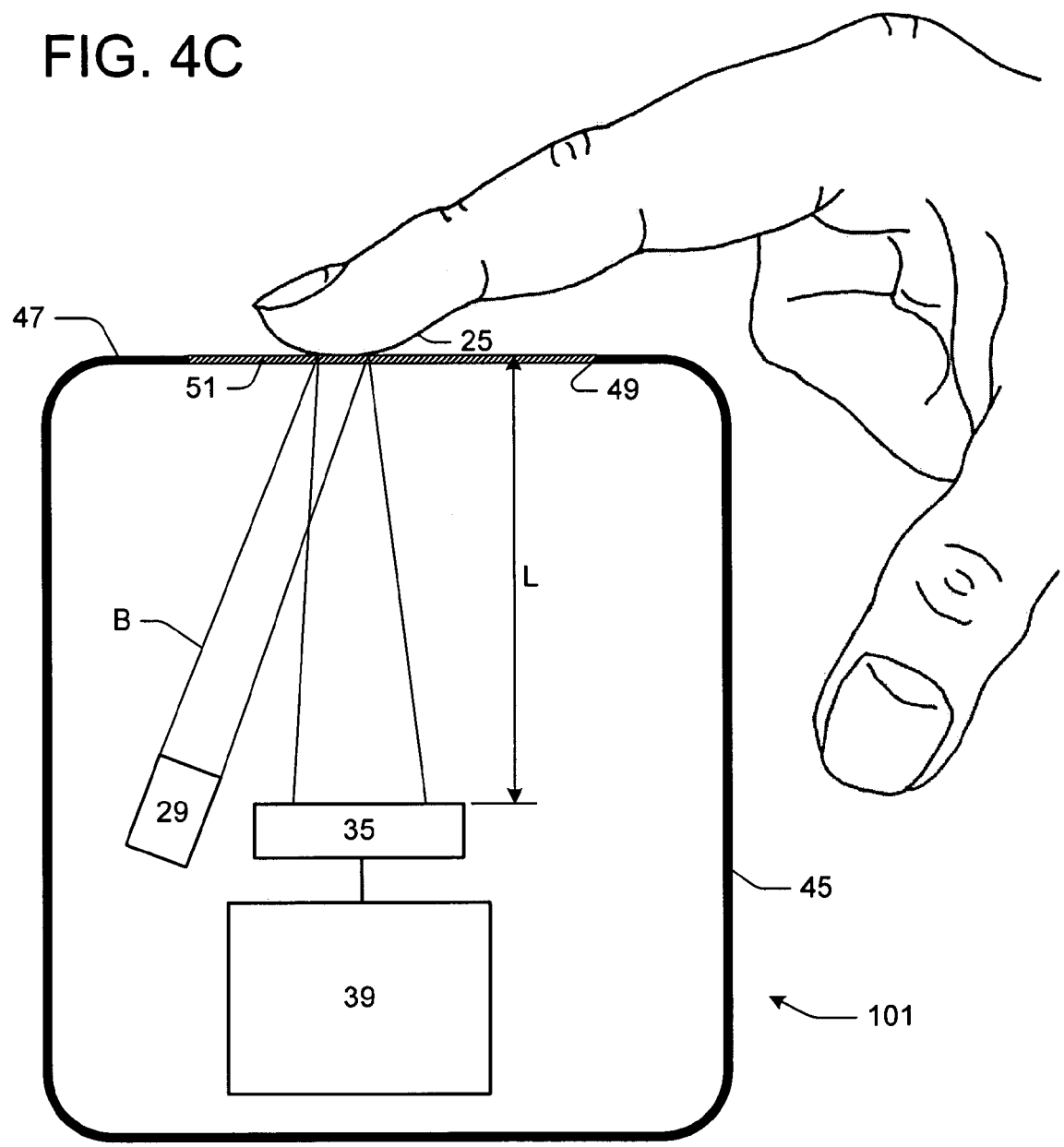
FIG. 4C is a schematic of still another device of the present invention engaging a tracking surface of human skin.

Referring now to FIG. 4C, a device, generally indicated 101, is depicted wherein the tracking surface 25 is human skin. In particular, the tracking surface 25 shown is a human finger. This device 101 demonstrates that the device itself may be stationary while the tracking surface 25 moves relative to the device. The functioning of the device components, such as the coherent light source 29, the detector 35, and the controller 39, is similar to those noted above. The device 101 depicted in FIG. 4C allows the user to move his hand, the tracking surface 25, over the device such that when the finger moves away from the device, the detector 35 and controller 39 are able to detect an off-surface condition and stop tracking, respectively.

As noted above, exemplary speckle patterns 33 are depicted in both FIGS. 5 and 6. In general, speckle patterns 33 captured by the detector 35 array have particular statistical properties based upon the inherent properties of laser speckle and the geometry of the device 21, 61, 71, 81, 101.

Such properties may be useful in detecting lift-off from a tracking surface 25. The speckle pattern 33' of FIG. 5 generally includes smaller speckle grains, on average, than the speckle grains of speckle pattern 33" of FIG. 6. The difference in average speckle grain size between FIGS. 5 and 6 is one example of the type of speckle grain size change that may be indicative of lift-off of the device 21, 61, 71, 81, 101. As the device moves relative to the tracking surface 25, speckle grain size changes, thereby altering the contrast of the detected speckle pattern 33. By analyzing changes in speckle grain size and/or speckle pattern 33 contrast, the separation distance S between the device 21, 61, 71, 81, 101 and the tracking surface 25 may be determined.

Turning to one relationship governing speckle behavior, the average speckle grain size of a coherent light beam B scattered off of an optically rough surface is given generally by $$\sigma = \frac{1.22 \lambda L}{D}$$

where σ is the average width of a speckle grain at the detector 35, λ is the wavelength of the coherent light beam B, L is the distance from the detector to the tracking surface 25, and D is the width of the beam, or illumination diameter, at the tracking surface (see FIGS. 1–4C). The wavelength λ of the coherent light beam B and the distance L from the detector 35 to the tracking surface 25 are directly proportional to average speckle grain size σ. The illumination diameter D is inversely proportional to average speckle grain size σ.

Therefore, according to the equation noted immediately above, as the device 21, 61, 71, 81, 101 and the tracking surface 25 move apart from one another (e.g., compare FIGS. 1 and 2), the distance L increases, and the illumination diameter D may increase, decrease, or stay the same, depending upon the shape of the coherent light beam B. In one example, the coherent light beam B may converge due to a converging optic 63 in the path of the coherent light beam (see FIGS. 3 and 4). Because the beam B converges, D will decrease as L increases, thereby increasing the average width of the speckle grains a according to the above equation. In another example, the beam B may diverge (see FIGS. 1, 2, 4A, and 4B) due to an inherent characteristic of the coherent light source 29 or due to a diverging optic (not shown). In this case, D will increase as L increases, such that the average width of each speckle grain σ may increase or decrease according to the above equation, depending upon the rate of change of both D and L as the device 21, 71, 81 and the tracking surface 25 move apart from one another. To ensure that the average speckle grain size a increases as the device 21, 71, 81 and the tracking surface 25 move apart from one another, L should increase at a faster rate than D. Both the distance T between the detector 35 and the support surface 47 of the device 21, 71, 81 (e.g., FIGS. 2 and 4) and an angle of inclusion β of the coherent light beam B (e.g., FIGS. 1 and 2) are factors affecting the rate of increase of the illumination diameter D with respect to the distance L from the detector to the tracking surface 25. For instance, decreasing the distance T between the detector 35 and the support surface 47 of the device 21, 71, 81 and decreasing the angle of inclusion β of the coherent light beam B will both, to varying degrees, increase the rate at which the average speckle grain size σ will increase as the device and the tracking surface 25 move apart from one another. In yet another example, the coherent light beam B neither converges nor diverges, but rather may comprise a beam of uniform width D at all distances from the coherent light source. By maintaining a constant width D, only L, the distance from the detector 35 to the tracking surface 25, changes as the separation distance S increases or decreases. Therefore, increasing the separation distance S increases the distance L, which increases speckle grain size σ in all cases. One skilled in the art would readily understand how to arrange the components of the device 21, 61, 71, 81, 101 such that average speckle grain size a will increase as the device and the tracking surface 25 move apart from one another.

Figure 7:
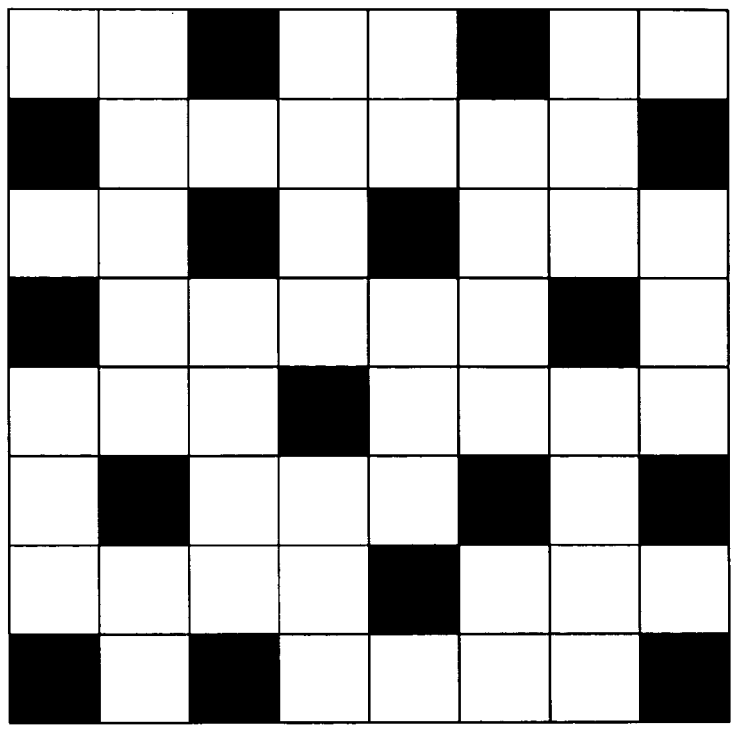
FIG. 7 is a schematic of a detected speckle pattern.
Figure 8:
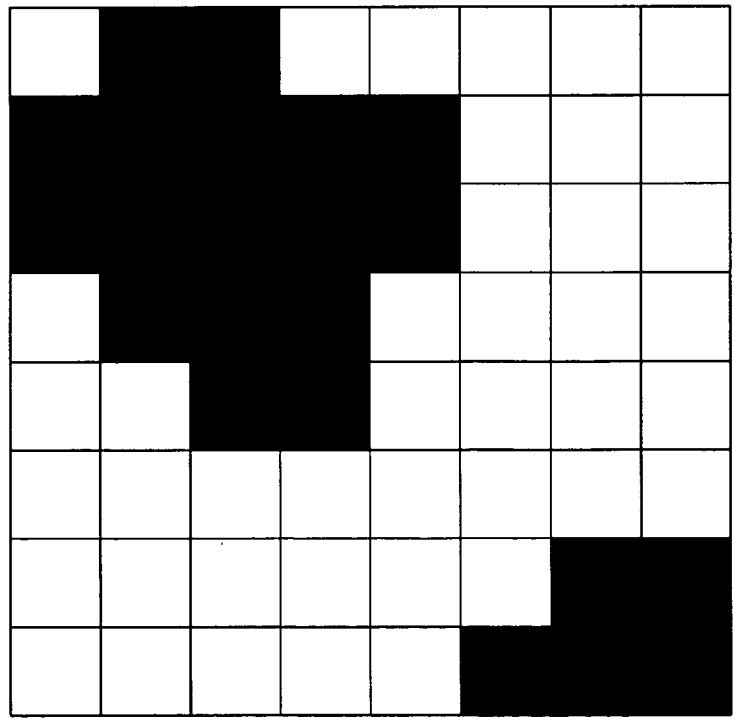
FIG. 8 is a schematic of a detected speckle pattern with a larger average speckle size than the speckle pattern of FIG. 7.

In one embodiment, the speckle size characteristic is a contrast characteristic of the detected speckle pattern 33. An exemplary technique for determining the contrast characteristic of the detected speckle pattern 33 is set forth in detail below in Appendix A, although other techniques are contemplated as within the scope of the claimed invention. In one example, the controller 39 may determine the contrast characteristic in one direction of the detected speckle pattern 33. For instance, FIGS. 7 and 8 are schematics of detected speckle patterns 33. The speckle pattern 33" of FIG. 8 includes a larger average speckle grain size a than the speckle pattern 33' of FIG. 7. The speckle patterns 33', 33" and the vertical contrast equation (V) of Appendix A yield vertical contrast characteristics of 27 and 111 for patterns 33' and 33", respectively. Because the speckle pattern 33' has a larger vertical contrast characteristic than the speckle pattern 33", one may infer that the average speckle grain size σ of FIG. 7 is smaller than that of FIG. 8. Similarly, the speckle patterns 33', 33" and the horizontal contrast equation (H) of Appendix A yield horizontal contrast characteristics of 26 and 10 for patterns 33' and 33", respectively. Again, because the speckle pattern 33' comprises a larger horizontal contrast characteristic than the speckle pattern 33", one may infer that the average speckle grain size a of FIG. 7 is smaller than that of FIG. 8. The contrast characteristics of speckle patterns 33' and 33" for each of the contrast equations are depicted in the following table:

|      | V  | H  | Da | Db |
|------|----|----|----|----|
| 33'  | 27 | 26 | 22 | 20 |
| 33"  | 11 | 10 | 12 | 11 |

In each direction, the contrast characteristic of speckle pattern 33' exceeds the contrast characteristic of speckle pattern 33".

In another example, the controller 39 may determine the contrast characteristic in at least two directions. The controller 39 in still another example may determine the contrast characteristic in at least four directions. In addition to these exemplary calculations, the contrast characteristic measurements may be combined according to the contrast equations of Appendix A to yield the following contrast characteristic values for the detected speckle patterns 33' and 33":

|     | Contrast1 | Contrast2 | Contrast3 | Contrast4 | Contrast99 |
|-----|-----------|-----------|-----------|-----------|------------|
| 33' | 27        | 53        | 95        | 26.5      | 23.75      |
| 33" | 11        | 21        | 44        | 10.5      | 11         |

For each contrast characteristic calculation, the contrast characteristic of speckle pattern 33' exceeds that of speckle pattern 33". The contrast characteristic may also be an average of the contrast in N directions (e.g., 2, 4, 6, . . . N directions).

Once the contrast characteristic of a detected speckle pattern 33 is determined, there are several possible ways of determining if the device 21, 61, 71, 81, 101 is operating in the tracking mode or the non-tracking mode. In one example, the controller 39 compares the contrast characteristic of the detected speckle pattern 33 with a threshold contrast characteristic for operating the device 21, 61, 71, 81, 101 in the tracking mode or the non-tracking mode. In this example, once the detected contrast characteristic falls below the threshold contrast characteristic, the controller 39 determines that the device 21, 61, 71, 81, 101 should be operating in a non-tracking mode and suspends tracking of the device relative to the tracking surface 25. Such a threshold contrast characteristic may be a baseline noise contrast characteristic as measured by the detector 35 when the device 21, 61, 71, 81, 101 is remote from the tracking surface 25, or when the coherent light source 29 is not projecting the coherent light beam, such as when the coherent light source is turned off. Such a baseline noise characteristic may be set in the controller 39 hardware or software.

In another example, the manufacture of each device 21, 61, 71, 81, 101 comprises individually calibrating each device to a specific contrast threshold. A non-volatile memory location in the device 21, 61, 71, 81, 101 may store the threshold.

In still another example, the controller 39 compares the contrast characteristic of the detected speckle pattern 33 to a previous contrast characteristic of a previously detected speckle pattern for operating the device in the tracking mode or the non-tracking mode. Instead of comparing the contrast characteristic to a constant threshold, the controller 39 compares the presently determined contrast characteristic to a previously determined contrast characteristic. The controller 39 may therefore continuously monitor the contrast characteristic to determine if it changes significantly over time, thereby indicating relative separation between the device 21 and the tracking surface 25.

In yet another example, the device 21, 61, 71, 81, 101 may compare the current contrast characteristic to both the threshold contrast characteristic and the previously determined contrast characteristic.

Figure 9:
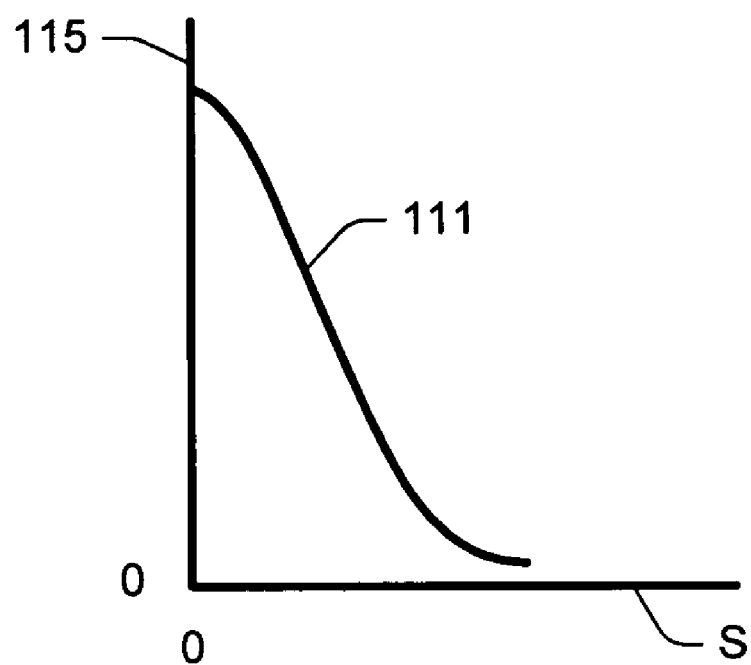
FIG. 9 is a graph depicting correlation value versus separation displacement of the device and tracking surface relative each other.

Referring now to FIG. 9, a graph includes a curve 111 depicting separation displacement S of the device 21, 61, 71, 81, 101 and the tracking surface 25 relative each other along an x-axis versus contrast 115 of the detected speckle pattern 33 along a y-axis. The graph depicts the relationship between the detected contrast of the speckle pattern 33 and separation displacement S. Where separation displacement S of the device 21, 61, 71, 81, 101 is near zero (x is close to 0) (see FIGS. 1, 3, and 4C), the curve 111 peaks, indicating a speckle pattern 33 of relatively small average speckle size and nearly no separation distance S, or lift-off, between the device 21, 61, 71, 81, 101 and the tracking surface 25. In other words, a separation displacement S of near zero corresponds to a nominal operating distance of the device 21, 61, 71, 81, 101 engaging the tracking surface 25. As displacement S increases (x>0), the contrast 115 falls from its peak along curve 111, thereby indicating a speckle pattern 33 of lower contrast, or relatively larger average speckle size. Once displacement S increases by a relatively large amount (x>>0), the contrast 115 falls even lower, indicating a speckle pattern 33 with relative large average speckle size.

In a further example, the controller 39 of the device 21, 61, 71, 81, 101 determines the speckle size characteristic by determining an auto-correlation characteristic of the detected speckle pattern 33. An auto-correlation characteristic is a mathematical comparison of an image to itself. Comparing adjacent pixels within the image with one another provides a measurement of the image's contrast. Two examples of auto-correlation are discussed in detail herein. A first example determines an auto-correlation value representative of image contrast by comparing each pixel of the detected speckle pattern to its nearest neighbor by shifting the speckle pattern a single pixel in one or more directions and determining the difference between each stationary pixel and each corresponding shifted pixel. A second example determines an auto-correlation value indicative of speckle size by shifting the detected speckle pattern one or more pixels in one or more directions to determine when the contrast between the stationary and shifted speckle patterns pass a particular threshold, which is in turn indicative of the speckle size.

Turning to the first auto-correlation example, a general auto-correlation equation is set forth in detail below in Appendix B. In this example, the controller 39 may determine the speckle auto-correlation characteristic by comparing each pixel of a detected speckle pattern 33 to each of the pixel's nearest neighbors. In other words, the speckle pattern 33 may be collectively shifted one pixel in a particular direction for determining the difference between each stationary pixel and each corresponding shifted pixel. The speckle pattern may then be collectively shifted one pixel in another direction for a similar determination, and so forth. These value may then be collected and operated upon as described an Appendix B to yield an overall auto-correlation value for the detected speckle pattern 33. The shifting and comparison may occur in eight directions, including vertical up, vertical down, horizontal left, horizontal right, diagonal down and right, diagonal up and right, diagonal down and left, and diagonal up and left, as is discussed in greater detail in Appendix B.

As with the contrast characteristic, once the auto-correlation characteristic of the detected speckle pattern 33 is determined, there are several possible ways of determining if the device 21, 61, 71, 81, 101 is operating in the tracking mode or the non-tracking mode. In one example, the controller 39 compares the auto-correlation characteristic with a threshold auto-correlation characteristic for operating the device 21, 61, 71, 81, 101 in the tracking mode or the non-tracking mode. In this example, once the auto-correlation characteristic falls below the threshold auto-correlation characteristic, the controller 39 determines that the device 21, 61, 71, 81, 101 should be operating in a non-tracking mode and suspends tracking of the tracking surface 25. In another example, the controller 39 compares the auto-correlation characteristic of the detected speckle pattern 33 to a previous auto-correlation characteristic of a previously detected speckle pattern for operating the device 21, 61, 71, 81, 101 in the tracking mode or the non-tracking mode. In another example, the device may compare the current auto-correlation characteristic to both the threshold auto-correlation characteristic and the previously determined auto-correlation characteristic.

Figures 10, 10A:
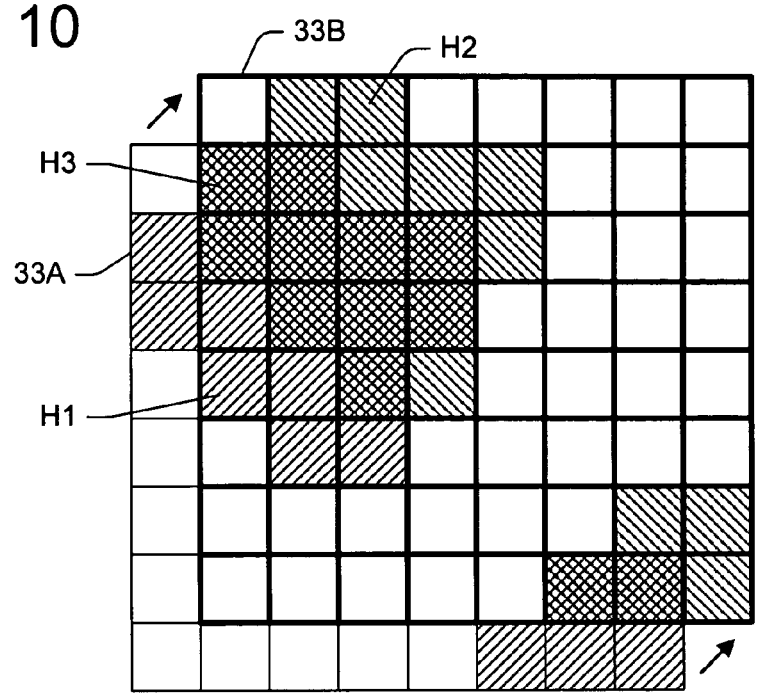
FIG. 10 is a depiction of a one-pixel shift of a copy of a detected speckle pattern for an auto-correlation calculation.
FIG. 10A is a depiction of the auto-correlation calculation results of the one-pixel shift of FIG. 10.

Turning to the second example, auto-correlation may also be utilized to determine the contrast of the detected speckle pattern 33 by displacing a copy of the speckle pattern, with respect to itself, one pixel width at a time and comparing the two speckle patterns until a particular auto-correlation threshold of the combined images is reached. Referring now to FIG. 10, a second copy 33B of the detected speckle pattern of FIG. 8 is shown overlapping a first copy 33A of the detected speckle pattern. The second copy 33B is shifted one pixel to the right and one pixel upward, relative to the first copy 33A. For identification purposes, the speckle features of the first copy 33A and the second copy 33B of the speckle pattern are identically positioned in each respective array, yet each is identified by a contrasting first hatch pattern H1 and second hatch pattern H2, respectively. Moreover, any pixel locations wherein the hatch pattern of both the first and second copies overlap are depicted as a third, combination, hatch pattern H3. These hatch patterns H1, H2, H3 provide a pictorial view of the interaction of the overlapping speckle patterns 33A, 33B as the pattern is compared with itself. For example, in FIG. 10, speckle features on the first copy 33A of the speckle pattern include a hatch pattern H1 with lines extending upward to the right, while speckle features on the second copy 33B of the speckle pattern include a hatch pattern H2 with lines extending upward to the left. Therefore, once the second copy 33B is shifted, overlapping speckle features will cooperate with one another to show a third speckle pattern H3 with crossed lines.

Applying an auto-correlation to the combined speckle patterns 33A, 33B requires selecting an operator for operating on the overlapping speckle features of the first and second copies of the speckle pattern. Any operator may be used, for example, multiplication, summation or subtraction, to name a few. In this example, subtraction is the operator, whereby, the image intensity value of each pixel is subtracted from each overlapping pixel and an absolute value of the result is taken, according to the equation included in Appendix B. In this simplified example, the speckle image is binary, such that the result of the subtraction is a value for each pixel of zero or one, as shown in each pixel FIG. 10A. Once each individual pixel value is determined, the entire array may be summed to establish the auto-correlation value for the specified shift. Thus, the auto-correlation value for this portion of the example is 16.

Figures 11, 11A:
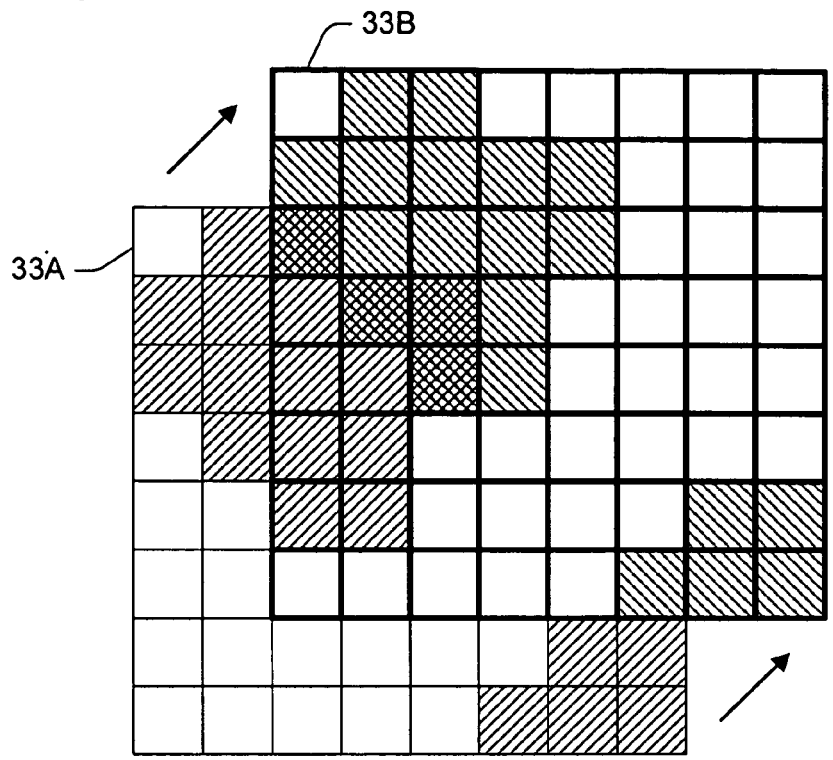
FIG. 11 is a depiction of a two-pixel shift of a copy of a detected speckle pattern for an auto-correlation calculation.
FIG. 11A is a depiction of the auto-correlation calculation results of the two-pixel shift of FIG. 10.

Turning now to FIGS. 11 and 11A, the second copy 33B of the detected speckle pattern is shifted two pixels to the right and two pixels upward relative to the first copy 33A. As above, an auto-correlation calculation is applied to the combined images, thereby calculating the values for each pixel, as depicted in FIG. 11A. The auto-correlation value for this portion of the example is 25. Although only two portions of the auto-correlation calculation are depicted here, one skilled in the art would appreciate that the second copy 33B of the detected speckle pattern may be shifted additional pixels up and to the right for an additional five calculations in this particular direction. In addition, the second copy 33B may be shifted in other directions for calculating the auto-correlation in the vertical, horizontal and other diagonal directions, as explained in detail in Appendix B. Moreover, with a detector array having more pixels, additional auto-correlation calculations may be performed.

Figure 12:
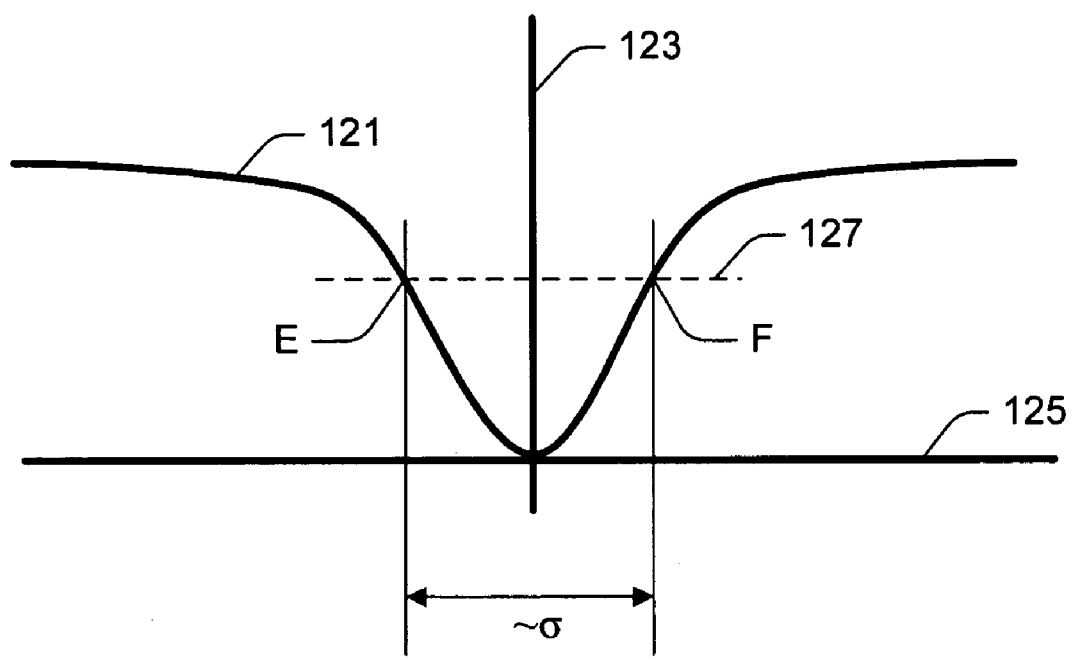
FIG. 12 is a graph depicting the relationship between a summation of differences, auto-correlation value of a detected speckle pattern and displacement of the detected speckle pattern with respect to itself.

Combining these summation of differences values together and plotting them with respect to the shift of the second copy 33B of the speckle pattern yields a graph resembling the one depicted in FIG. 12. Specifically, the graph includes a curve 121 demonstrating the relationship between a summation of differences, auto-correlation value 123 of a detected speckle pattern (y-axis) and displacement of the detected speckle pattern 125 with respect to itself (x-axis). Where displacement of the second copy 33B with respect to the first copy 33A is zero (x=0), the auto-correlation curve 121 defines a minimum of zero, indicating no difference between the speckle pattern and itself, or a substantially perfect correlation. This result is self-evident, considering that the difference between something and itself is zero. As the second copy 33B shifts with respect to the first copy 33A in one direction or another, pixel by pixel, the summation of differences auto-correlation value increases from its minimum, indicating a larger difference between the speckle pattern and itself, or a lower correlation between the overlapped speckle patterns. This is borne out by the examples noted above, where the summation of differences auto-correlation value increases to 16 with a one-pixel shift and increases to 25 with a two-pixel shift. Once displacement of the second copy 33B of the speckle image increases by a relatively large amount (x<<0 or x>>0), the summation of differences auto-correlation value increases even higher, indicating large differences between the speckle patterns, or very little correlation between the speckle patterns.

Although the general shape of the curve 121 is similar for most detected speckle patterns, its shape changes according to the average speckle grain size a $\sigma$ of the speckle pattern 33. Where average speckle grain size $\sigma$ is relatively large, such as those shown in FIGS. 10, 10A, 11 and 11A, each pixel step away from the minimum has a relatively small impact on the summation of differences waveform correlation value relative to the displacement of the speckle pattern. This is because larger speckles, although misaligned, will have more overlap with one another than smaller speckle grains translated a similar distance. For the larger speckles, the shift will identify several differences over the combined array, while many of the pixels will overlap a pixel having a similar value, yielding no difference. Conversely, where average speckle grain size $\sigma$ is relatively small (FIG. 5), each pixel step away from the minimum will create a larger increase in the summation of differences waveform correlation value because smaller speckles will tend to misalign to a large degree relative one another. Thus, smaller speckle grains will yield a curve 121 having a narrower trough that increases in value more quickly as a function of displacement 125 than a similarly displaced speckle pattern comprised of larger speckle grains. Importantly, a line of constant auto-correlation value, or threshold 127, passing through the curve 121 will intersect the curve at two points E and F. The distance between such points is related to the average speckle grain size $\sigma$ and may be utilized as the speckle size characteristic.

It should be understood by those skilled in the art that other operators will yield a differently shaped auto-correlation curve. For instance, introducing addition as the operator will invert curve 121, yielding a maximum, rather than a minimum at zero displacement 125. In addition, the graph depicted in FIG. 12 depicts auto-correlation readings in only two opposed directions, such as left and right or up and down. One skilled in the art would understand that such auto-correlation values may be calculated by shifting the speckle pattern in any direction. Moreover, such calculations may be combined to produce several curves that together may more accurately define the size and shape of the detected speckles. Furthermore, one skilled in the art would appreciate that the auto-correlation need not be calculated pixel-by-pixel beginning with displacement of one pixel and ending at the end of the detected array. For example, if any auto-correlation value for a particular pixel shift exceeds a given threshold, the analysis may end because the speckle size is effectively determined. Moreover, one may determine where to begin the analysis based upon the auto-correlation values of the previous calculation or by where it appears the auto-correlation values are moving.

In another example, the controller 39 determines the contrast characteristic of the detected speckle pattern 33 by determining a number of image intensity transitions across the speckle pattern 33. Image intensity transitions constitute determining the number of high to low transitions, or speckle grain edges, that exist in the speckle pattern 33. This determination differs from the contrast characteristic and auto-correlation characteristic methodologies described above. While the contrast characteristic determines the intensity changes between each adjacent pixel of the speckle pattern 33, determining the number of image intensity transitions focuses on only those differences in adjacent pixels corresponding to a high to low transition or to a low to high transition. Such transitions mark the edge of a speckle grain. In other words, only those differences in adjacent pixels that exceed a particular minimum value will become a part of the evaluation.

In another embodiment, the device 21, 61, 71, 81, 101 performs a spatial frequency analysis of the detected speckle pattern 33 to determine the speckle size characteristic. One such spatial frequency analysis performed by the controller is a Fast Fourier Transform (FFT) analysis. An FFT analysis focuses on the spatial transition of the detected speckle pattern 33, specifically the different spatial modulations of the detected signal. In particular, a signal having a larger proportion of its spatial frequency content at a high spatial frequency is consistent with small average speckle grain size σ, while a signal having a larger proportion of its spatial frequency content at a low spatial frequency is consistent with large average speckle grain size. To utilize this spatial information from the detected speckle pattern 33, the spatial frequency content is broken into particular spatial frequency ranges, thereby creating a histogram indicative of the spatial frequency content.

In one example, three spatial frequency ranges are utilized, namely a low spatial frequency range, a medium spatial frequency range and a high spatial frequency range. Where much of the spatial frequency content falls within the high spatial frequency range, the speckle pattern 33 is determined to include relatively small speckle grains on average, indicating the device 21, 61, 71, 81, 101 is substantially engaged with the tracking surface 25. In contrast, where much of the spatial frequency content falls within the low spatial frequency range, the speckle pattern 33 is determined to include relatively large speckle grains, indicating the device 21, 61, 71, 81, 101 is not substantially engaged with the tracking surface 25. The FFT analysis provides data for this type of analysis, as one skilled in the art would readily appreciate. In this manner, the controller 39 may readily monitor the content of the spatial frequency range to determine if lift-off has occurred. In another example, a band pass filter may be included to focus the inquiry on a particular spatial frequency band that includes an appropriate sensitivity to changes in lift-off. Other types of spatial frequency analysis (e.g., cosine transform, other Fourier transforms, etc.) may be utilized in a similar fashion without departing from the scope of the claimed invention.

In addition to the embodiments described above for determining average speckle grain size σ, another embodiment of the claimed invention comprises measuring the width of at least one speckle grain of the speckle pattern 33 and monitoring the changes to the speckle grain width to determine the operating mode of the device, generally as set forth above.

It should be noted that any of the above-described techniques for determining the speckle size characteristic may be utilized redundantly with one another (e.g., a contrast characteristic determination combined with a spatial frequency analysis) to ensure the off-surface condition is detected, either by reducing false positives or increasing lift-off sensitivity.

Any of the devices 21, 61, 71, 81, 101 of the claimed invention described above may incorporate one of a variety of different coherent light sources 29 (e.g., lasers) having different properties. In one instance, the device 21, 61, 71, 81, 101 may include a coherent light source 29 capable of producing a coherent light beam B having an angle of inclusion β of less than about 790 milliradians (45 degrees). Another device 21, 61, 71, 81, 101 may control the angle of inclusion β of its coherent light beam B to less than about 170 milliradians (10 degrees). Still another device 21, 61, 71, 81, 101 may control the angle of inclusion β of its coherent light beam B to less than about 87 milliradians (5 degrees). Such coherent light sources 29 may control beam divergence in any number of ways without departing from the scope of the claimed invention. As discussed above with respect to FIGS. 3 and 4, the device 21 may comprise an optic 63 refracting the coherent light beam B between the coherent light source 29 and the tracking surface 25. Although not shown, the optic may also be integral with the coherent light source 29.

Exemplary lasers 29 will draw as little current as possible. For instance, a suitable laser 29 consumes less than about 20 milli-Amps of current during operation. This ensures that the laser 29 may be used in a cordless device application without unduly limiting the battery life of the device. In particular, the laser 29 may also be a solid-state device, such as a vertical cavity surface emitting laser (VCSEL) or an edge-emitting laser (EEL). Other lasers and sources of laser, or coherent, light may also be utilized without departing from the scope of the claimed invention.

The present invention further includes a method comprising projecting a coherent light beam B from a data input device 21, 61, 71, 81, 101 onto a tracking surface 25 having light-scattering properties, generally as set forth above. The method further comprises detecting at least a portion of the light scattered by the tracking surface 25. The detected scattered light comprises a speckle pattern 33. The method further comprises determining if the device 21, 61, 71, 81, 101 is spatially separated from the tracking surface 25 by at least a lift-off detection distance as a function of a speckle size characteristic of the detected speckle pattern 33. The method further comprises either (i) suspending tracking of relative movement between the device 21, 61, 71, 81, 101 and the tracking surface 25 when the device is spatially separated from the tracking surface by at least the lift-off detection distance or (ii) maintaining tracking of relative movement between the device and the tracking surface when the device is spatially separated from the tracking surface by less than the lift-off detection distance. The lift-off detection distance is a design parameter incorporated into the device 21, 61, 71, 81, 101 as a transition between surface tracking and lift-off, whereby the user may expect the device to temporarily suspend tracking for device repositioning.

In another embodiment, the method may further comprise determining a contrast characteristic of the detected speckle pattern 33, generally as set forth above. The method may further comprise comparing the contrast characteristic of the detected speckle pattern 33 with a threshold contrast characteristic. The method may further comprise comparing the contrast characteristic of the detected speckle pattern 33 to a previous contrast characteristic of a previously detected speckle pattern.

In still another embodiment, the determining comprises determining a number of image intensity transitions across the detected speckle pattern 33, generally as set forth above. In yet another embodiment, the determining comprises performing a spatial frequency analysis of the detected speckle pattern to determine the speckle size characteristic. The performing of a spatial frequency analysis may comprise performing a Fast Fourier Transform (FFT) analysis, generally as set forth above, or other spatial frequency analyses.

In another embodiment, the determining comprises measuring a width of at least one speckle grain of the detected speckle pattern 33 and monitoring changes to the width of the at least one speckle grain, generally as set forth above. In still another embodiment, the determining comprises determining an auto-correlation characteristic of the detected speckle pattern, generally as set forth above.

In yet another embodiment, the lift-off detection distance is no more than about 10 millimeters (0.39 inch). In still another embodiment, the lift-off detection distance is no more than about 4 millimeters (0.16 inch). In a further embodiment, the lift-off detection distance is no more than about 4 millimeters (0.16 inch) and at least about 1 millimeter (0.04 inch).

Figure 13:
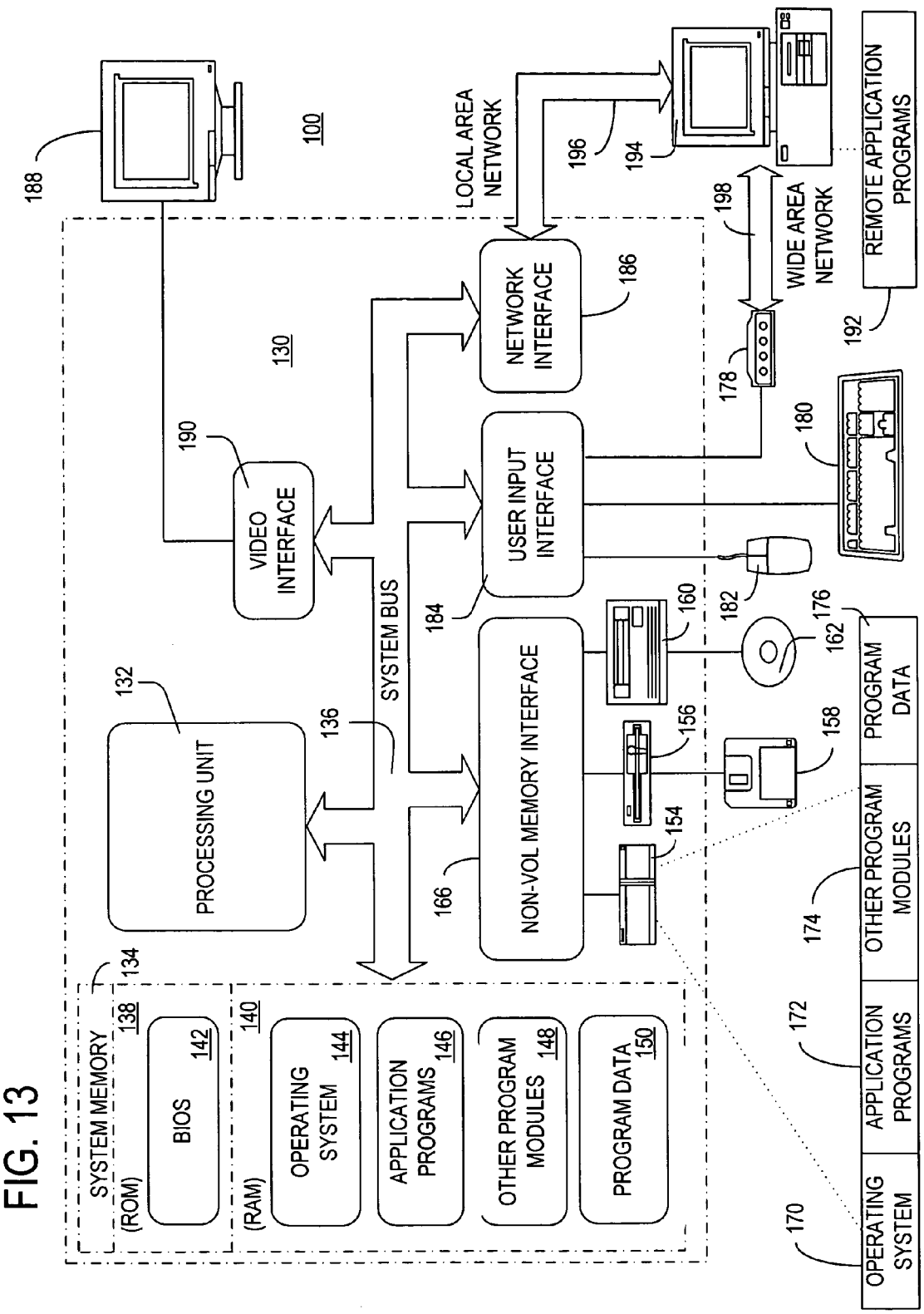
FIG. 13 is a block diagram illustrating one example of a suitable computing system environment in which the invention may be implemented.

FIG. 13 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 13 illustrates operating system 144, application programs 146, other program modules 148, and program data 150.

The computer 130 may also include other removable/non-removable, volatile/nonvolatile computer storage media. For example, FIG. 13 illustrates a hard disk drive 154 that reads from or writes to non-removable, nonvolatile magnetic media. FIG. 13 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid-state RAM, solid-state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 13, provide storage of computer readable instructions, data structures, program modules and other data for the computer 130. In FIG. 13, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, finger tracker, or the like. These and other input devices are connected to processing unit 132 through a user input interface 184 that is coupled to system bus 136, but may be connected by other interface and bus structures, such as a parallel port, game port, PS/2 port or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or substantially all of the elements described above relative to computer 130. The logical connections depicted in FIG. 13 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 13 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the operations described below in conjunction with a microprocessor or other data processor.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, personal digital assistants (PDAs), network PCs, minicomputers, mainframe computers, distributed computing environments that include any of the above systems or devices, and the like. The present invention is also applicable for non-computer applications, such as television remote cursor control, among others.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

APPENDIX A

The following illustrates an exemplary method of determining the speckle size characteristic of the detected speckle pattern utilizing the contrast of the detected speckle pattern.

The contrast characteristic measuring technique performs calculations on the detected speckle pattern. The detector detects the speckle pattern at regular intervals over time. The contrast of each speckle pattern is determined using one of the techniques described below—contrast characteristic or auto-correlation characteristic.

The contrast characteristic value decreases as the device and tracking surface move apart relative one another. Typical systems have a noise level which will produce a non-zero contrast characteristic when the device is far away, so the threshold value for the detection scheme may be set above this noise level, as discussed above. The following variables are defined by the equations noted below:

N=number of rows in the detector array;

M=number of columns in the detector array;

Y=row index for the detector array;

X=column index for the detector array;

Σ=Summation;

Pixel[x, y]=Pixel location in an array of speckle pattern (image) data;

and

ABS=Absolute Value Function, Or Squaring Function, Or any $X^k$ Function (where k=even number);

The following equations may be utilized to calculate contrast characteristic in four directions:

$V$=Vertical contrast characteristic {for $x=0$ to $m$, $y=0$ to $n-1$} $\Sigma(ABS(\text{Pixel}[x, y]-\text{Pixel}[x, y+1])$;

$H$=Horizontal contrast characteristic {for $x=0$ to $m-1$, $y=0$ to $n$} $\Sigma(ABS(\text{Pixel}[x, y]-\text{Pixel}[x+1, y])$;

$Da$=Diagonal contrast characteristic (down, right) {for $x=0$ to $m-1$, $y=0$ to $n-1$} $\Sigma(ABS(\text{Pixel}[x, y]-\text{Pixel}[x+1, y+1])$; and $Db$=Diagonal contrast characteristic (down, left) {for $x=1$ to $m$, $y=0$ to $n-1$} $\Sigma(ABS(\text{Pixel}[x, y]-\text{Pixel}[x-1, y+1])$).

The contrast characteristic of the detected speckle pattern may be defined in a single direction or a combination of one or more of the directions noted above. In one example, any one or more of the following equations may be used:

Contrast1=$V$ (one direction);

Contrast2=$(V+H)$ (two directions);

Contrast3=$(V+H+Da+Db)$ (four directions);

Contrast4=$(V+H)/2$ (average in two directions); and

:

Contrast99=$(V+H+Da+Db)/4$ (average in four directions).

Other equations combining the four directional equations noted above are contemplated as within the scope of the claimed invention. Other contrast equations not specifically mentioned here are also contemplated as within the scope of the claimed invention. For example, the ABS function noted above may be replaced with a multiplication function, such as:

Pixel[$x_1$, $y_1$]*Pixel[$x_2$, $y_2$], without departing from the scope of the claimed invention.

APPENDIX B

The following illustrates an exemplary method of determining the speckle size characteristic of the detected speckle pattern utilizing auto-correlation.

In addition to the contrast characteristic, the auto-correlation characteristic may be utilized as a measure of speckle pattern contrast by performing a comparison in horizontal, vertical, and diagonal directions. For example, a general form for an autocorrelation equation is given by $$\frac{1}{MN}\sum_{m=0}^{M-1}\sum_{n=0}^{N-1} |F(m, n) \otimes F(x+m, y+n)|$$

where M and N are the number of pixels in each respective column and row of an array, m and n define respective column and row positions within the array, and x and y are shifts of the array with respect to itself along the m and n axes, respectively. Note that any operation may be substituted for the operator $\otimes$ in the above equation. In the following equation, for example, subtraction is the operator for calculating a sum of differences $$\frac{1}{MN}\sum_{m=0}^{M-1}\sum_{n=0}^{N-1} |F(m, n) - F(x+m, y+n)|$$

For instance, applying the equation noted above to an eight by eight array would yield 64 different summations summed together and subsequently divided by 64, thereby providing an average auto-correlation value for the detected speckle pattern.

In another example, the following more specific contrast equations, which are based on the generalized auto-correlation equation noted above, may be used:

$V+$=Vertical contrast (down) {for $x=0$ to $m$, $y=0$ to $n-1$} $\Sigma(ABS(\text{Pixel}[x, y]-\text{Pixel}[x, y+1])$;

$V-$=Vertical contrast (up) {for $x=0$ to $m$, $y=1$ to $n$} $\Sigma(ABS(\text{Pixel}[x, y]-\text{Pixel}[x, y-1])$;

$H+$=Horizontal contrast (right) {for $x=0$ to $m-1$, $y=0$ to $n$} $\Sigma(ABS(\text{Pixel}[x, y]-\text{Pixel}[x+1, y])$;

$H-$=Horizontal contrast (left) {for $x=1$ to $m$, $y=0$ to $n$} $\Sigma(ABS(\text{Pixel}[x, y]-\text{Pixel}[x-1, y])$;

$D++$=Diagonal contrast (down, right) {for $x=0$ to $m-1$, $y=0$ to $n-1$} $\Sigma(ABS(\text{Pixel}[x, y]-\text{Pixel}[x+1, y+1])$;

$D-+$=Diagonal contrast (up, right) {for $x=0$ to $m-1$, $y=1$ to $n$} $\Sigma(ABS(\text{Pixel}[x, y]-\text{Pixel}[x+1, y-1])$;

$D+-$=Diagonal contrast (down, left) {for $x=1$ to $m$, $y=0$ to $n-1$} $\Sigma(ABS(\text{Pixel}[x, y]-\text{Pixel}[x-1, y+1])$; and $D--$=Diagonal contrast (up, left) {for $x=1$ to $m$, $y=1$ to $n$} $\Sigma(ABS(\text{Pixel}[x, y]-\text{Pixel}[x-1, y-1])$).

In this example, the auto-correlation characteristic of the detected speckle pattern may be defined as a combination of the contrast directions noted immediately above. In one example, the following auto-correlation may be used:

Auto-Correlation=$\Sigma(V+, V-, H+, H-, D++, D-+, D+-, D--)/8$.

Note that when the detected speckle pattern is large, some of the contrast values may be very similar in value. Specifically, $V+$ and $V-$ may be similar, $H+$ and $H-$ may be similar, $D++$ and $D--$ may be similar, and $D+-$ and $D-+$ may be similar. Thus, when the detector array is large, the auto-correlation calculation may simplify to the Contrast99 equation noted in Appendix A.

What is claimed is:

1. A data input device for use with a tracking surface, said tracking surface having light-scattering properties with respect to said device, said device comprising:

a coherent light source for projecting a coherent light beam onto said tracking surface, said tracking surface scattering the coherent light beam striking said tracking surface;

a detector associated with the coherent light source for detecting at least a portion of said scattered light, said detected portion comprising a speckle pattern; and a controller configured to respond to the detected speckle pattern and operate the device in one of a tracking mode and a non-tracking mode depending upon a speckle size characteristic of the detected speckle pattern as determined by said controller, wherein said controller is configured to perform a spatial frequency analysis of said detected speckle pattern to determine said speckle size characteristic.

2. A device as set forth in claim 1 wherein said speckle size characteristic is a contrast characteristic of said detected speckle pattern.

3. A device as set forth in claim 2 wherein said controller is configured to determine said contrast characteristic in at least one direction.

4. A device as set forth in claim 3 wherein said controller is configured to determine said contrast characteristic in at least two directions.

5. A device as set forth in claim 4 wherein said controller is configured to determine said contrast characteristic in at least four directions.

6. A device as set forth in claim 2 wherein said controller is configured to compare said contrast characteristic of the detected speckle pattern with a threshold contrast characteristic for operating the device in the tracking mode or the non-tracking mode.

7. A device as set forth in claim 6 wherein said threshold contrast characteristic exceeds a baseline noise contrast characteristic measured by said detector when said device is remote from said tracking surface.

8. A device as set forth in claim 2 wherein said controller is configured to compare said contrast characteristic of the detected speckle pattern to a previous contrast characteristic of a previously detected speckle pattern for operating the device in the tracking mode or the non-tracking mode.

9. A device as set forth in claim 1 wherein said controller is configured to determine the speckle size characteristic of said detected speckle pattern by determining a number of image intensity transitions across said detected speckle pattern.

10. A device as set forth in claim 1 wherein said controller is configured to perform a Fast Fourier Transform (FFT) analysis to determine said speckle size characteristic.

11. A device as set forth in claim 1 wherein said controller is configured to measure a width of at least one speckle grain of said speckle pattern and monitor changes to said at least one speckle grain width for operating the device in the tracking mode or the non-tracking mode.

12. A device as set forth in claim 1 wherein said speckle size characteristic is an auto-correlation characteristic of said detected speckle pattern.

13. A device as set forth in claim 12 wherein said controller is configured to compare said auto-correlation characteristic of the detected speckle pattern with a threshold auto-correlation characteristic for operating the device in the tracking mode or the non-tracking mode.

14. A device as set forth in claim 12 wherein said controller is configured to determine said auto-correlation characteristic in at least one direction.

15. A device as set forth in claim 1 further comprising a housing associated with the coherent light source and the detector, said housing including a support surface adapted to engage said tracking surface.

16. A device as set forth in claim 1 wherein said coherent light source and said detector are mounted adjacent each other on at least one of a micro-chip, a printed circuit board (PCB), and a leadframe.

17. A device as set forth in claim 1 wherein the coherent light source is a laser.

18. A device as set forth in claim 17 wherein an angle of inclusion of said coherent light beam is less than about 790 milliradians (45 degrees).

19. A device as set forth in claim 18 wherein said angle of inclusion is less than about 170 milliradians (10 degrees).

20. A device as set forth in claim 19 wherein said angle of inclusion is less than about 87 milliradians (5 degrees).

21. A device as set forth in claim 1 wherein the coherent light source consumes less than about 20 milli-Amps of current during operation.

22. A device as set forth in claim 1 further comprising an optic refracting the coherent light beam between the coherent light source and the tracking surface.

23. A device as set forth in claim 1 wherein said tracking surface is human skin.

24. A device as set forth in claim 1 wherein said controller is at least one of a processor and an application-specific integrated circuit (ASIC).

25. A method comprising:
projecting a coherent light beam from a data input device onto a tracking surface having light-scattering properties, said tracking surface scattering the coherent light beam,
detecting at least a portion of the light scattered by the tracking surface, said detected portion comprising a speckle pattern,
determining if said device is spatially separated from said tracking surface by at least a lift-off detection distance as a function of a speckle size characteristic of said speckle pattern, and
either suspending tracking of relative movement between said device and said tracking surface when said device is spatially separated from said tracking surface by at least the lift-off detection distance or maintaining tracking of relative movement between said device and said tracking surface when said device is spatially separated from said tracking surface by less than said lift-off detection distance.

26. A method as set forth in claim 25 wherein said determining comprises determining a contrast characteristic of said detected speckle pattern.

27. A method as set forth in claim 26 further comprising comparing said contrast characteristic of the detected speckle pattern with a threshold contrast characteristic.

28. A method as set forth in claim 26 further comprising comparing said contrast characteristic of the detected speckle pattern to a previous contrast characteristic of a previously detected speckle pattern.

29. A method as set forth in claim 25 wherein said determining comprises determining a number of image intensity transitions across said detected speckle pattern.

30. A method as set forth in claim 25 wherein said determining comprises performing a spatial frequency analysis of the detected speckle pattern to determine said speckle size characteristic.

31. A method as set forth in claim 30 wherein said performing comprises performing a Fast Fourier Transform (FFT) analysis.

32. A method as set forth in claim 25 wherein said determining comprises measuring a width of at least one speckle grain of the detected speckle pattern and monitoring changes to said width of the at least one speckle grain.

33. A method as set forth in claim 25 wherein said determining comprises determining an auto-correlation characteristic of the detected speckle pattern.

34. A method as set forth in claim 25 wherein said lift-off detection distance is no more than about 10 millimeters (0.39 inch).

35. A method as set forth in claim 34 wherein said lift-off detection distance is no more than about 4 millimeters (0.16 inch).

36. A method as set forth in claim 35 wherein said lift-off detection distance is at least about 1 millimeter (0.04 inch).

37. A data input device for use with a tracking surface, said tracking surface having light-scattering properties with respect to said device, said device comprising
- a coherent light source for projecting a coherent light beam onto said tracking surface, said tracking surface scattering the coherent light beam striking said tracking surface;
- a detector associated with the coherent light source for detecting at least a portion of said scattered light, said detected portion comprising a speckle pattern; and
- a controller configures to respond to the detected speckle pattern and determine a distance between the device and the tracking surface depending upon a speckle size characteristic of the detected speckle pattern as determined by said controller.

38. A device as set forth in claim 37 further comprising a housing for the coherent light source and the detector, said housing including a support surface adapted to engage said tracking surface.

39. A device as set forth in claim 37 wherein said speckle size characteristic is related to the distance between the housing and the tracking surface.

* * * * *